(12) United States Patent
Srinivasan

(10) Patent No.: US 12,367,044 B2
(45) Date of Patent: Jul. 22, 2025

(54) TRACKING INSTRUCTION HANDLING USING OPCODE MATCHING IN PROCESSOR-BASED DEVICES

(71) Applicant: QUALCOMM Incorporated, San Diego, CA (US)

(72) Inventor: Prasanna Srinivasan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 18/473,414

(22) Filed: Sep. 25, 2023

(65) Prior Publication Data

US 2025/0103336 A1 Mar. 27, 2025

(51) Int. Cl.
| | | |
|---|---|---|
| G06F 9/30 | (2018.01) | |
| G06F 11/34 | (2006.01) | |
| G06F 11/36 | (2025.01) | |
| G06F 11/362 | (2025.01) | |

(52) U.S. Cl.
CPC ...... *G06F 9/30145* (2013.01); *G06F 9/30101* (2013.01); *G06F 9/3013* (2013.01); *G06F 9/30189* (2013.01); *G06F 11/3466* (2013.01); *G06F 11/3648* (2013.01)

(58) Field of Classification Search
None
See application file for complete search history.

(56) References Cited

U.S. PATENT DOCUMENTS

| | | | | |
|---|---|---|---|---|
| 4,674,089 | A | * | 6/1987 | Poret ..................... G06F 11/261 714/28 |
| 5,388,233 | A | | 2/1995 | Hays et al. |
| 5,790,843 | A | * | 8/1998 | Borkenhagen .......... G06F 9/328 712/226 |
| 6,539,502 | B1 | * | 3/2003 | Davidson ............ G06F 11/3466 714/E11.2 |
| 6,574,727 | B1 | | 6/2003 | Davidson et al. |
| 7,228,266 | B1 | | 6/2007 | Sollom et al. |
| 11,221,929 | B1 | * | 1/2022 | Katz ........................ G06N 3/04 |
| 11,237,894 | B1 | * | 2/2022 | Baum ................... G06F 11/076 |
| 11,263,077 | B1 | * | 3/2022 | Seznayov ............... G06F 3/064 |
| 2005/0071570 | A1 | * | 3/2005 | Takasugl ............. G06F 12/0862 711/137 |

(Continued)

OTHER PUBLICATIONS

IBM Technical Disclosure Bulletin 'Internal Instruction Frequency Monitoring—NB9206246' Jun. 1, 1992. (Year: 1992).*

(Continued)

*Primary Examiner* — Steven G Snyder
(74) *Attorney, Agent, or Firm* — W&T

(57) ABSTRACT

Tracking instruction handling using opcode matching in processor-based devices is disclosed herein. In some aspects, a processor-based device provides a processor device that comprises an opcode match register, an accumulator register, and an instruction processing circuit. The instruction processing circuit is configured to determine that an instruction of a plurality of instructions matches an opcode value stored in the opcode match register. The instruction processing circuit is further configured to, responsive to determining that the instruction matches the opcode value stored in the opcode match register, modify a value stored in the accumulator register without halting or modifying program control flow.

24 Claims, 6 Drawing Sheets

(56) References Cited

U.S. PATENT DOCUMENTS

| | | | | |
|---|---|---|---|---|
| 2006/0277395 A1* | 12/2006 | Fowles | ................ | G06F 11/348 712/227 |
| 2015/0186140 A1* | 7/2015 | Toll | ...................... | G06F 9/3861 712/244 |
| 2022/0100601 A1* | 3/2022 | Baum | ................ | G06F 11/1608 |
| 2022/0101042 A1* | 3/2022 | Kaminitz | ............... | G06N 3/048 |
| 2022/0101043 A1* | 3/2022 | Katz | .................... | H03M 13/15 |
| 2022/0103186 A1* | 3/2022 | Kaminitz | ............. | H03M 13/15 |

OTHER PUBLICATIONS

'Operating System: The Basics' section 1.3.1 by Patrick McClanahan, archived on Sep. 17, 2021. (Year: 2021).*
'How Microprocessors Work' by Marshall Brain & Chris Pollette, Sep. 22, 2021. (Year: 2021).*
International Search Report and Written Opinion for International Patent Application No. PCT/US2024/042121, mailed Nov. 12, 2024, 15 pages.

* cited by examiner

TRACKING INSTRUCTION HANDLING USING OPCODE MATCHING IN PROCESSOR-BASED DEVICES

BACKGROUND

I. Field of the Disclosure

The technology of the disclosure relates generally to debugging and profiling applications executing on a processor-based device, and, in particular, to opcode match and trap functionality provided by a processor-based device.

II. Background

Microprocessors, also referred to herein as "processors," perform computational tasks for a wide variety of applications. To assist with application debugging, some processor devices provide a functionality known as "opcode match and trap" that allows debugging software to obtain additional information on the executing application. Opcode match and trap functionality allows an opcode corresponding to a particular instruction or an opcode mask corresponding to a group of instructions to be specified, e.g., by writing a corresponding value to an opcode match register and optionally to an opcode mask register. When an instruction that matches the opcode itself (or the opcode masked using the opcode mask) is encountered while executing an application, the processor device may perform special handling for the instruction, based on a value stored in an opcode match control register of the processor. For example, the value stored in the opcode match control register may cause the processor device to halt execution of the application and enter a debug state, or may cause the processor device to transfer program control to an exception handler.

While conventional opcode match and trap functionality can provide access to detailed data on the executing application, such functionality is generally more useful in the context of debugging software than in analyzing or benchmarking application performance. Accordingly, it may be desirable to provide access to additional data to facilitate application profiling and benchmarking while minimizing any negative impacts on processor performance.

SUMMARY OF THE DISCLOSURE

Aspects disclosed in the detailed description include tracking instruction handling using opcode matching in processor-based devices. Related apparatus and methods are also disclosed. In this regard, in some exemplary aspects disclosed herein, a processor device comprises an instruction processing circuit for processing (i.e., fetching, decoding, executing, and retiring) a plurality of instructions. The processor device also comprises an opcode match register and an accumulator register. The opcode match register stores an opcode value against which each instruction among the plurality of instructions is compared by the instruction processing circuit. If the instruction matches the opcode value stored in the opcode match register, the instruction processing circuit is configured to modify a value stored in the accumulator register (e.g., by incrementing or decrementing the value), without halting or modifying program control flow. In this manner, the opcode match register and the accumulator register provide access to data that enables executing applications to be profiled and benchmarked, with only minimal effects on the performance of the processor.

Some aspects may provide that determining that the instruction matches the opcode value stored in the opcode match register comprises determining that an opcode of the instruction matches the opcode value stored in the opcode match register. In some such aspects, the processor device may also provide an opcode mask register that stores an opcode mask. Such aspects may provide that determining that the opcode of the instruction matches the opcode value stored in the opcode match register comprises determining that the opcode of the instruction masked using the opcode mask matches the opcode value when masked using the opcode mask. This enables instruction matching to be performed on groups of instructions having opcodes that match the opcode mask.

According to some aspects in which the processor device operates in an "instruction count mode," the value stored in the accumulator register represents a count of occurrences of the instruction. In such aspects, the instruction processing circuit modifies the value stored in the accumulator register by a value of one (1) (i.e., by incrementing or decrementing the value by one (1)). Some aspects in which the processor device operates in a "total processing time mode" may provide that the value stored in the accumulator register represents a total time spent processing occurrences of the instruction. In such aspects, the instruction processing circuit modifies the value stored in the accumulator register by a time value indicating a time interval between fetching of the instruction and an occurrence of an end event (e.g., retiring the instruction, determining whether the instruction matches the opcode value, and/or tagging the instruction as a result of the determining, as non-limiting examples). In some aspects, the processor device may be configured to support both the instruction count mode and the total processing time mode described above. In such aspects, a mode indicator that indicates either the instruction count mode or the total processing time mode may be provided to indicate how the accumulator register is to be modified by the instruction processing circuit.

Some aspects further provide that the processor device further comprises an opcode match control register that allows the functionality described above to be selectively enabled and disabled by an executing software process (such as an operating system (OS) or a hypervisor) that writes an enable value or a disable value, respectively, to the opcode match control register. According to such aspects, the instruction processing circuit may determine that the instruction matches the opcode value stored in the opcode match register responsive to determining that the value of the opcode match control register is the enable value. The executing software process in some aspects may also enable and disable the functionality described above depending on a current software context. Thus, the executing software process may set the value of the opcode match control register to the enable value while executing in a first software context, and subsequently may set the value of the opcode match control register to a disable value while executing in a second software context (i.e., after a context switch). Some aspects may also provide that the executing software process may read the value stored in the accumulator register, and/or may reset the value stored in the accumulator register (e.g., to a value of zero (0) or to some other predefined reset value).

In another aspect, a processor device is disclosed. The processor device comprises an opcode match register and an accumulator register, and an instruction processing circuit. The instruction processing circuit is configured to determine that an instruction of a plurality of instructions matches an opcode value stored in the opcode match register. The instruction processing circuit is further configured to, responsive to determining that the instruction matches the opcode value stored in the opcode match register, modify a value stored in the accumulator register without halting or modifying program control flow.

In another aspect, a processor device is disclosed. The processor device comprises means for determining that an instruction of a plurality of instructions matches an opcode value stored in an opcode match register of the processor device. The processor device further comprises means for modifying a value stored in an accumulator register of the processor device without halting or modifying program control flow, responsive to determining that the instruction matches the opcode value stored in the opcode match register.

In another aspect, a method for tracking instruction handling using opcode matching in processor-based devices is disclosed. The method comprises determining, by an instruction processing circuit of a processor device, that an instruction of a plurality of instructions matches an opcode value stored in an opcode match register of the processor device. The method further comprises, responsive to determining that the instruction matches the opcode value stored in the opcode match register, modifying, by the instruction processing circuit, a value stored in an accumulator register of the processor device, without halting or modifying program control flow.

In another aspect, a non-transitory computer-readable medium is disclosed. The non-transitory computer-readable medium stores computer-executable instructions that, when executed, cause a processor device of a processor-based device to determine that an instruction of a plurality of instructions matches an opcode value stored in an opcode match register of the processor device. The computer-executable instructions further cause the processor device to, responsive to determining that the instruction matches the opcode value stored in the opcode match register, modify a value stored in an accumulator register of the processor device, without halting or modifying program control flow.

DETAILED DESCRIPTION

Figure 1:
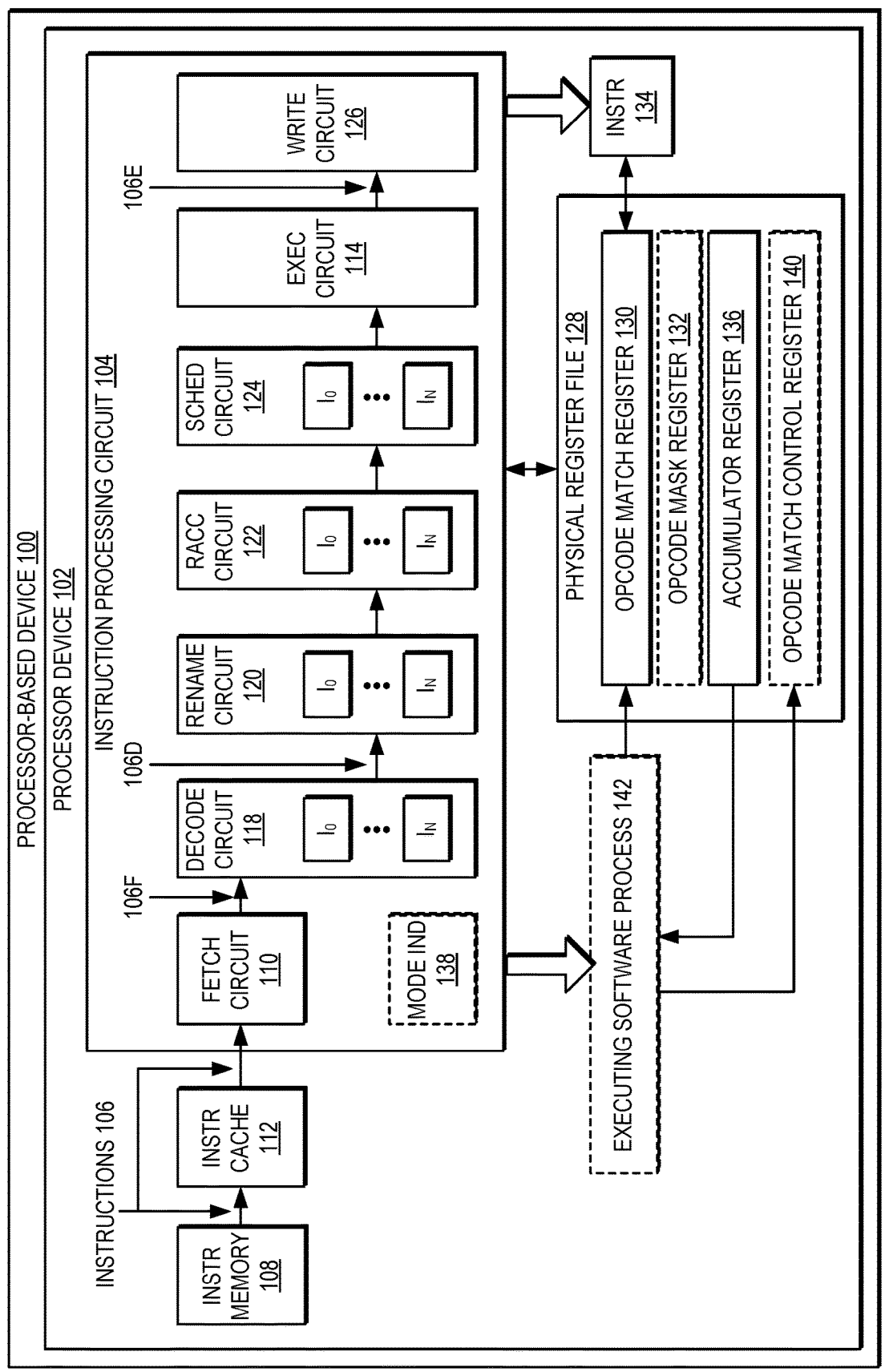
FIG. 1 is a block diagram of an exemplary processor-based device including an instruction processing circuit configured to track instruction handling using opcode matching, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like used herein are intended to distinguish between similarly named elements, and do not indicate an ordinal relationship between such elements unless otherwise indicated.

Aspects disclosed in the detailed description include tracking instruction handling using opcode matching in processor-based devices. Related apparatus and methods are also disclosed. In this regard, in some exemplary aspects disclosed herein, a processor device comprises an instruction processing circuit for processing (i.e., fetching, decoding, executing, and retiring) a plurality of instructions. The processor device also comprises an opcode match register and an accumulator register. The opcode match register stores an opcode value against which each instruction among the plurality of instructions is compared by the instruction processing circuit. If the instruction matches the opcode value stored in the opcode match register, the instruction processing circuit is configured to modify a value stored in the accumulator register (e.g., by incrementing or decrementing the value), without halting or modifying program control flow. In this manner, the opcode match register and the accumulator register provide access to data that enables executing applications to be profiled and benchmarked, with only minimal effects on the performance of the processor.

Some aspects may provide that determining that the instruction matches the opcode value stored in the opcode match register comprises determining that an opcode of the instruction matches the opcode value stored in the opcode match register. In some such aspects, the processor device may also provide an opcode mask register that stores an opcode mask. Such aspects may provide that determining that the opcode of the instruction matches the opcode value stored in the opcode match register comprises determining that the opcode of the instruction masked using the opcode mask matches the opcode value when masked using the opcode mask. This enables instruction matching to be performed on groups of instructions having opcodes that match the opcode mask.

According to some aspects in which the processor device operates in an "instruction count mode," the value stored in the accumulator register represents a count of occurrences of the instruction. In such aspects, the instruction processing circuit modifies the value stored in the accumulator register by a value of one (1) (i.e., by incrementing or decrementing the value by one (1)). Some aspects in which the processor device operates in a "total processing time mode" may provide that the value stored in the accumulator register represents a total time spent processing occurrences of the instruction. In such aspects, the instruction processing circuit modifies the value stored in the accumulator register by a time value indicating a time interval between fetching of the instruction and an occurrence of an end event (e.g., retiring the instruction, determining whether the instruction matches the opcode value, and/or tagging the instruction as a result of the determining, as non-limiting examples). In some aspects, the processor device may be configured to support both the instruction count mode and the total processing time mode described above. In such aspects, a mode indicator that indicates either the instruction count mode or the total processing time mode may be provided to indicate how the accumulator register is to be modified by the instruction processing circuit.

Some aspects further provide that the processor device further comprises an opcode match control register that allows the functionality described above to be selectively enabled and disabled by an executing software process (such as an operating system (OS) or a hypervisor) that writes an enable value or a disable value, respectively, to the opcode match control register. According to such aspects, the instruction processing circuit may determine that the instruction matches the opcode value stored in the opcode match register responsive to determining that the value of the opcode match control register is the enable value. The executing software process in some aspects may also enable and disable the functionality described above depending on a current software context. Thus, the executing software process may set the value of the opcode match control register to the enable value while executing in a first software context, and subsequently may set the value of the opcode match control register to a disable value while executing in a second software context (i.e., after a context switch). Some aspects may also provide that the executing software process may read the value stored in the accumulator register, and/or may reset the value stored in the accumulator register (e.g., to a value of zero (0) or to some other predefined reset value).

In this regard, FIG. 1 is a diagram of an exemplary processor-based device 100 that includes a processor device 102. The processor device 102, which also may be referred to as a "processor core" or a "central processing unit (CPU) core," may be an in-order or an out-of-order processor (OoP), and/or may be one of a plurality of processor devices 102 provided by the processor-based device 100. In the example of FIG. 1, the processor device 102 includes an instruction processing circuit 104 that includes one or more instruction pipelines $I_0$-$I_N$ for processing a plurality of instructions 106 fetched from an instruction memory (captioned "INSTR MEMORY" in FIG. 1) 108 by a fetch circuit 110 for execution. The instruction memory 108 may be provided in or as part of a system memory in the processor-based device 100, as a non-limiting example. An instruction cache (captioned "INSTR CACHE" in FIG. 1) 112 may also be provided in the processor device 102 to cache the instructions 106 fetched from the instruction memory 108 to reduce latency in the fetch circuit 110.

The fetch circuit 110 in the example of FIG. 1 is configured to provide the instructions 106 as fetched instructions 106F into the one or more instruction pipelines $I_0$-$I_N$ in the instruction processing circuit 104 to be pre-processed, before the fetched instructions 106F reach an execution circuit (captioned "EXEC CIRCUIT" in FIG. 1) 114 to be executed. The instruction pipelines $I_0$-$I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 114.

With continuing reference to FIG. 1, the instruction processing circuit 104 includes a decode circuit 118 configured to decode the fetched instructions 106F fetched by the fetch circuit 110 into decoded instructions 106D to determine the instruction type and actions required. The instruction type and action required encoded in the decoded instructions 106D may also be used to determine in which instruction pipeline $I_0$-$I_N$ the decoded instructions 106D should be placed. In this example, the decoded instructions 106D are placed in one or more of the instruction pipelines $I_0$-$I_N$ and are next provided to a rename circuit 120 in the instruction processing circuit 104. The rename circuit 120 is configured to determine if any register names in the decoded instructions 106D should be renamed to decouple any register dependencies that would prevent parallel or out-of-order processing.

The instruction processing circuit 104 in the processor device 102 in FIG. 1 also includes a register access circuit (captioned "RACC CIRCUIT" in FIG. 1) 122. The register access circuit 122 is configured to access a physical register in a physical register file (PRF) (not shown) based on a mapping entry mapped to a logical register in a register mapping table (RMT) (not shown) of a source register operand of a decoded instruction 106D to retrieve a produced value from an executed instruction 106E in the execution circuit 114. The register access circuit 122 is also configured to provide the retrieved produced value from an executed instruction 106E as the source register operand of a decoded instruction 106D to be executed.

Also, in the instruction processing circuit 104, a scheduler circuit (captioned "SCHED CIRCUIT" in FIG. 1) 124 is provided in the instruction pipeline $I_0$-$I_N$ and is configured to store decoded instructions 106D in reservation entries until all source register operands for the decoded instruction 106D are available. The scheduler circuit 124 issues decoded instructions 106D that are ready to be executed to the execution circuit 114. A write circuit 126 is also provided in the instruction processing circuit 104 to write back or commit produced values from executed instructions 106E to memory (such as the PRF), cache memory, or system memory.

As seen in FIG. 1, the processor-based device 100 provides a physical register file 128 that comprises an opcode match register 130. In conventional use, the opcode match register 130 may be used to provide "opcode match and trap" functionality. To provide this functionality, the opcode match register 130 stores an opcode value (not shown) against which one of the plurality of instructions 106 may be compared by the instruction processing circuit 104. If an opcode of the instruction matches the opcode value, the instruction processing circuit 104 may cause the processor device 102 to, e.g., halt execution of the application and enter a debug state, or transfer program control to an exception handler (not shown).

Some aspects may further provide an opcode mask register 132 in which an opcode mask (not shown) may be stored. The opcode mask may comprise a plurality of bits in which bits set to a value of one (1) indicate bits of interest to be used in comparing the opcode of an instruction to the opcode value stored in the opcode match register 130, while bits set to a value of zero (0) are to be disregarded. In such aspects, the opcode of the instruction is masked using the opcode mask (e.g., by performing a logic AND operation with the opcode of the instruction and the opcode mask). The opcode value stored in the opcode match register 130 is likewise masked using the opcode mask, and is then compared to the masked opcode of the instruction. If the masked values match, the instruction processing circuit 104 may cause the processor device 102 to, e.g., halt execution of the application and enter a debug state, or transfer program control to an exception handler (not shown).

As noted above, such opcode match and trap functionality may be useful in the context of debugging software, but may not prove as useful for analyzing or benchmarking application performance. In this regard, the instruction processing circuit 104 may be configured to use the opcode match register 130 to track instruction handling using opcode matching. In exemplary operation, the instruction processing circuit 104 determines that an instruction 134 of the plurality of instructions 106 matches an opcode value stored in the opcode match register 130 of the processor device 102 (e.g., by determining that an opcode of the instruction 134 matches the opcode value stored in the opcode match register 130). Aspects in which the processor device 102 comprises the opcode mask register 132 may provide that the instruction processing circuit 104 determines that the opcode of the instruction 134 matches the opcode value stored in the opcode match register 130 by determining that the opcode of the instruction 134 masked using an opcode mask stored in the opcode mask register 132 matches the opcode value masked using the opcode mask.

The instruction processing circuit 104, in response to determining that the instruction 134 matches the opcode value stored in the opcode match register 130, modifies a value stored in an accumulator register 136 of the processor device 102, without halting or modifying program control flow. Modifying the value stored in the accumulator register 136 may comprise, e.g., incrementing the value or decrementing the value, as non-limiting examples. In aspects in which the value stored in the accumulator register 136 represents a count of occurrences of the instruction 134 (i.e., an "instruction count mode"), the instruction processing circuit 104 may modifying the value stored in the accumulator register 136 by modifying the value stored in the accumulator register 136 by a value of one (1). Aspects in which the value stored in the accumulator register 136 represent a total time spent processing occurrences of the instruction 134 (i.e., a "total processing time mode") may provide that the instruction processing circuit 104 modifies the value stored in the accumulator register 136 by modifying the value stored in the accumulator register 136 by a time value indicating a time interval between fetching of the instruction 134 and an occurrence of an end event. The end event may comprise, e.g., retiring of the instruction 134, determining whether the instruction 134 matches the opcode value, and/or tagging the instruction 134 as a result of the determining, as non-limiting examples. The time interval in such aspects may be determined based on, e.g., tags or other instruction metadata (not shown) associated with the instruction 134 and indicating the time the instruction 134 was fetched and the time the end event occurred.

In some aspects, the processor device 102 may be configured to support both the instruction count mode and the total processing time mode referenced above. In such aspects, the instruction processing circuit 104 comprises a mode indicator (captioned as "MODE IND" in FIG. 1) 138 that may be set by software, and that indicates either the instruction count mode or the total processing time mode. The instruction processing circuit 104 in such aspects is configured to modify the accumulator register 136 in appropriate fashion based on the mode indicator 138.

In some aspects, the processor device 102 further includes an opcode match control register 140 that may be used by an executing software process 142 (such as an operating system or hypervisor) to selectively enable or disable the tracking of instruction handling. Thus, for example, the instruction processing circuit 104 in such aspects may determine that a value of the opcode match control register 140 is an enable value, and may subsequently determine that the instruction 134 matches the opcode value stored in the opcode match register 130 responsive to determining that the value of the opcode match control register 140 is the enable value.

Some aspects may provide that the executing software process 142 may enable or disable the tracking of instruction handling in response to software context changes. Accordingly, in some such aspects, the executing software process 142 may set the value of the opcode match control register 140 to the enable value while executing in a first software context. Subsequently, the executing software process 142 in such aspects may set the value of the opcode match control register 140 to a disable value while executing in a second software context. The executing software process 142 may also read the value stored in the accumulator register 136, and/or may reset the value stored in the accumulator register 136 (e.g., by setting the accumulator register 136 to a value of zero (0) or to some other predefined reset value). In this manner, the executing software process 142 may read and reset the value in the accumulator register 136 in response to, e.g., a software context change, or may opt to maintain the value in the accumulator register 136 and monitor changes to the value in the accumulator register 136 over time.

Figure 2:
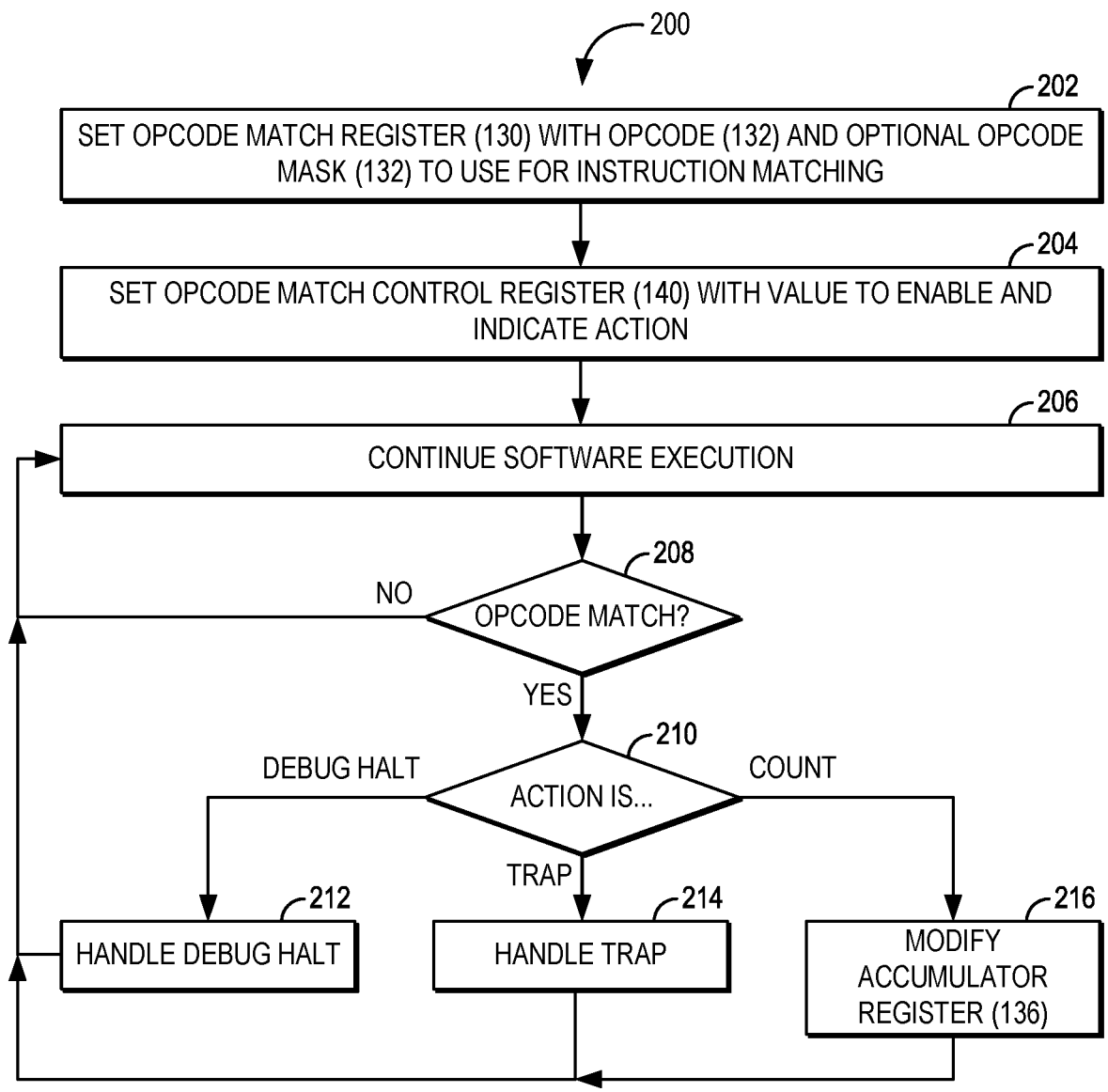
FIG. 2 provides a flowchart illustrating exemplary operations of the instruction processing circuit of FIG. 1 for tracking instruction handling using opcode matching, according to some aspects.

FIG. 2 illustrates exemplary operations 200 that may be performed by the instruction processing circuit 104 of FIG. 1 when tracking instruction handling using opcode matching. Elements of FIG. 1 are referenced in describing FIG. 2 for the sake of clarity. In FIG. 2, the exemplary operations 200 begin with the opcode match register 130 being set with an opcode value (and, optionally, the opcode mask register 132 being set with an opcode mask) to be used for instruction matching (block 202). In addition, the opcode match control register 140 is set with a value to enable and indicate the action to be performed (i.e., conventional debug or trap functionality, or tracking of instruction handling) (block 204). Software execution then continues (block 206). During instruction processing by the instruction processing circuit 104, the instruction processing circuit 104 determines whether the instruction 134 matches the opcode value stored in the opcode match register 130 (optionally masked using the opcode mask stored in the opcode mask register 132) (block 208). If not, processing continues at block 206.

However, if the instruction processing circuit 104 determines at decision block 208 that the instruction 134 matches the opcode value stored in the opcode match register 130, the instruction processing circuit 104 then determines the appropriate action to perform based on the opcode match control register 140 (block 210). If the value stored in the opcode match control register 140 indicates debug functionality, the instruction processing circuit 104 handles a debug halt (e.g., by placing the executing software process 142 in a debug mode) (block 212). Processing then continues at block 206. If the value stored in the opcode match control register 140 indicates trap functionality, the instruction processing circuit 104 handles a trap (e.g., by transferring program control to an exception handler) (block 214). Processing then continues at block 206. Finally, if the value stored in the opcode match control register 140 indicates count functionality, the instruction processing circuit 104 modifies the accumulator register 136 (block 216). Processing then continues at block 206.

Figure 3A:
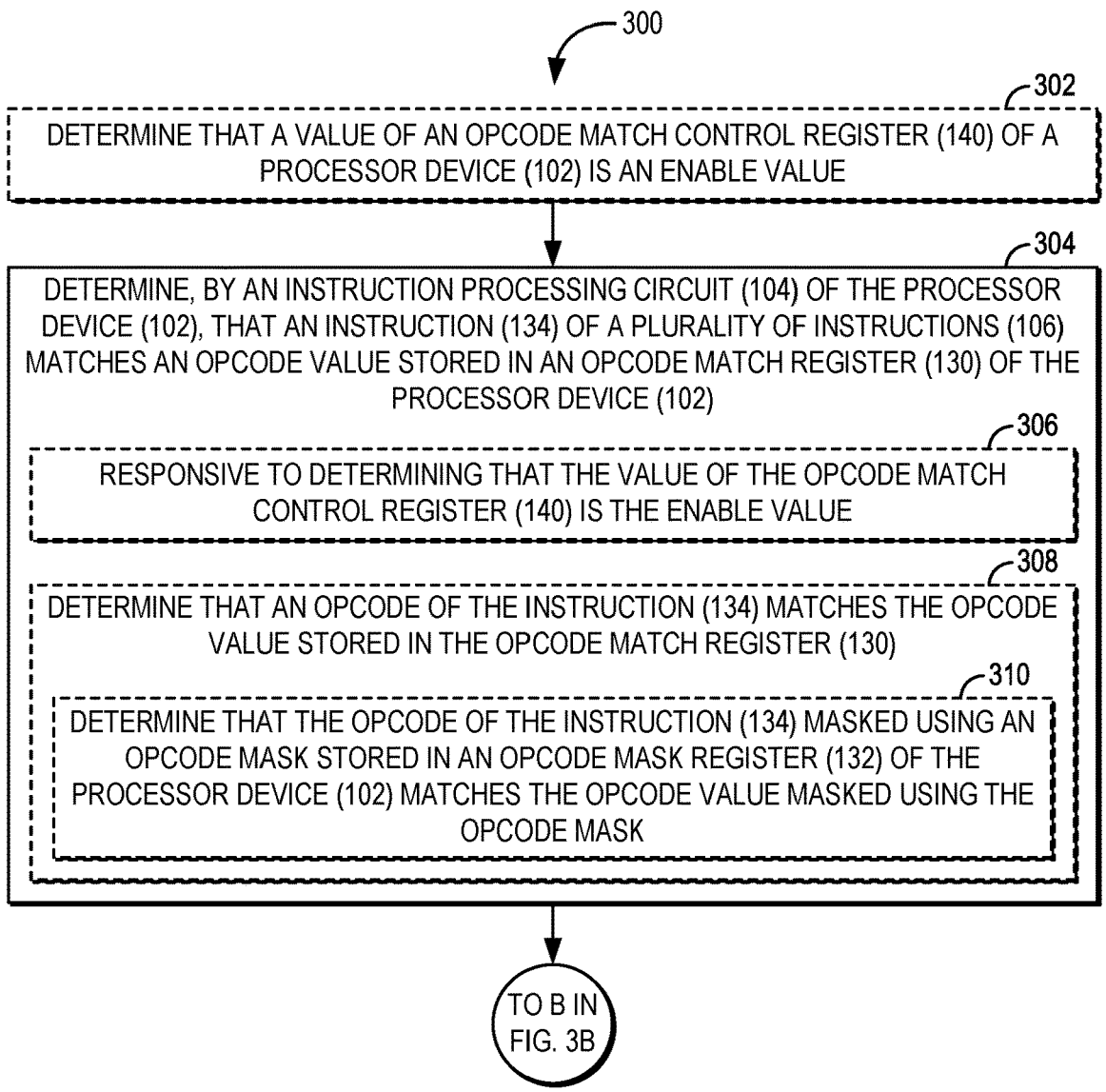
FIGS. 3A-3C provide a flowchart illustrating further exemplary operations of the instruction processing circuit of FIG. 1 for tracking instruction handling using opcode matching, according to some aspects.
Figure 3B:
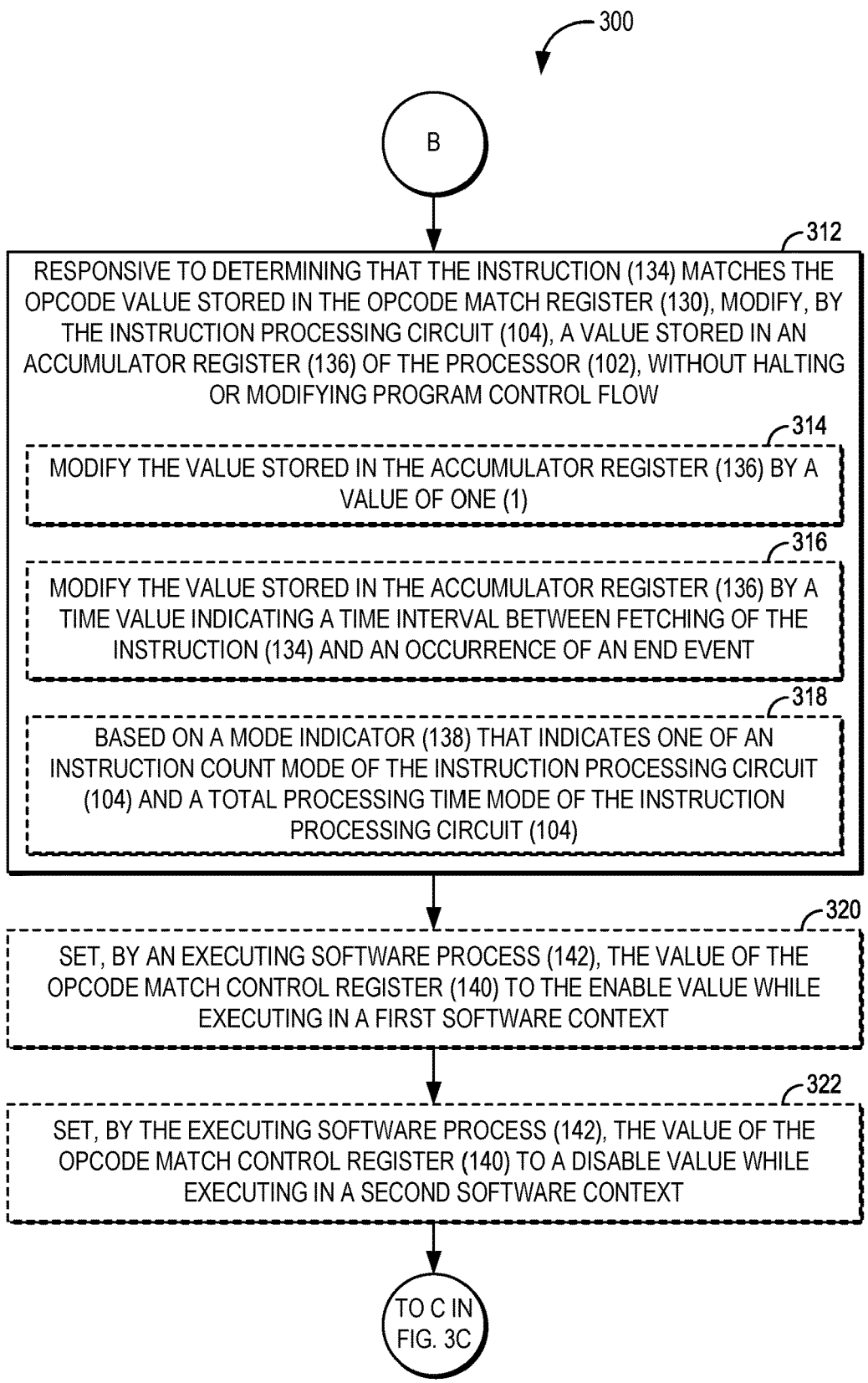
Figure 3C:
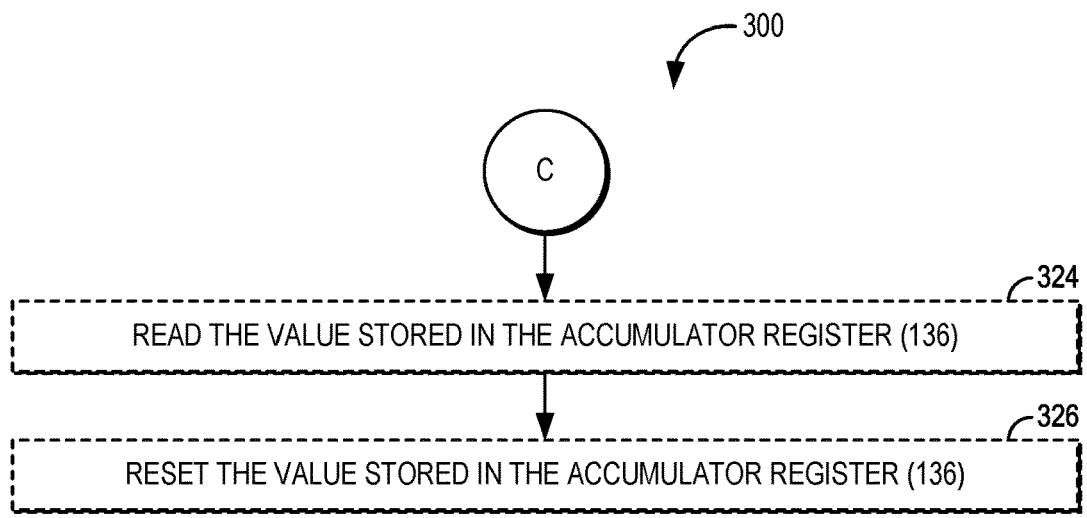

To illustrate operations performed by the instruction processing circuit 104 of FIG. 1 for tracking instruction handling using opcode matching according to some aspects, FIGS. 3A-3C provide a flowchart showing exemplary operations 300. For the sake of clarity, elements of FIG. 1 are referenced in describing FIGS. 3A-3C. It is to be understood that some aspects may provide that some operations illustrated in FIGS. 3A-3C may be performed in an order other than that illustrated herein, and/or may be omitted.

Operations in FIG. 3A in some aspects begin with an instruction processing circuit of a processor device (e.g., the instruction processing circuit 104 of the processor device 102 of FIG. 1) determining that a value of an opcode match control register (such as the opcode match control register 140 of FIG. 1) of the processor device 102 is an enable value (block 302). The instruction processing circuit 104 determines that an instruction of a plurality of instructions (such as the instruction 134 of the plurality of instructions 106 of FIG. 1) matches an opcode value stored in an opcode match register (e.g., the opcode match register 130 of FIG. 1) of the processor device 102 (block 304). In some aspects, the operations of block 304 for determining that the instruction 134 matches the opcode value stored in the opcode match register 130 are performed responsive to determining that the value of the opcode match control register 140 is the enable value (block 306). According to some aspects, the operations of block 304 for determining that the instruction 134 matches the opcode value stored in the opcode match register 130 may comprise determining that an opcode of the instruction 134 matches the opcode value stored in the opcode match register 130 (block 308). In some such aspects, the operations of block 308 for determining that the opcode of the instruction 134 matches the opcode value stored in the opcode match register 130 comprises determining that the opcode of the instruction 134 masked using an opcode mask stored in an opcode mask register (e.g., the opcode mask register 132 of FIG. 1) of the processor device 102 matches the opcode value masked using the opcode mask (block 310). The exemplary operations 300 then continue at block 312 of FIG. 3B.

Turning now to FIG. 3B, the instruction processing circuit 104, in response to determining that the instruction 134 matches the opcode value stored in the opcode match register 130, modifies a value stored in an accumulator register (e.g., the accumulator register 136 of FIG. 1) of the processor device 102, without halting or modifying program control flow (block 312). In aspects in which the value stored in the accumulator register 136 represent a count of occurrences of the instruction 134, the operations of block 312 for modifying the value stored in the accumulator register 136 may comprise modifying the value stored in the accumulator register 136 by a value of one (1) (block 314). Aspects in which the value stored in the accumulator register 136 represent a total time spent processing occurrences of the instruction 134 may provide that the operations of block 312 for modifying the value stored in the accumulator register 136 comprise modifying the value stored in the accumulator register 136 by a time value indicating a time interval between fetching of the instruction 134 and an occurrence of an end event (e.g., retiring the instruction 134, determining whether the instruction 134 matches the opcode value, and/or tagging the instruction 134 as a result of the determining, as non-limiting examples) (block 316). In some aspects, the operations of block 312 for modifying the value stored in the accumulator register 136 may be based on based on a mode indicator (such as the mode indicator 138 of FIG. 1) that indicates one of an instruction count mode of the instruction processing circuit 104 and a total processing time mode of the instruction processing circuit 104 (block 318).

In some aspects, a software process being executed by the instruction processing circuit 104 (e.g., the executing software process 142 of FIG. 1) may set the value of the opcode match control register 140 to the enable value while executing in a first software context (block 320). Subsequently, the executing software process 142 in such aspects may set the value of the opcode match control register 140 to a disable value while executing in a second software context (block 322). The exemplary operations in some aspects may continue at block 324 of FIG. 3C.

Referring now to FIG. 3C, some aspects may provide that the executing software process 142 may read the value stored in the accumulator register 136 (block 324). In some aspects, the executing software process 142 may reset the value stored in the accumulator register 136 (e.g., to a value of zero (0) or to some other predefined reset value) (block 326).

The instruction processing circuit according to aspects disclosed herein and discussed with reference to FIGS. 1, 2, and 3A-3C may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 4:
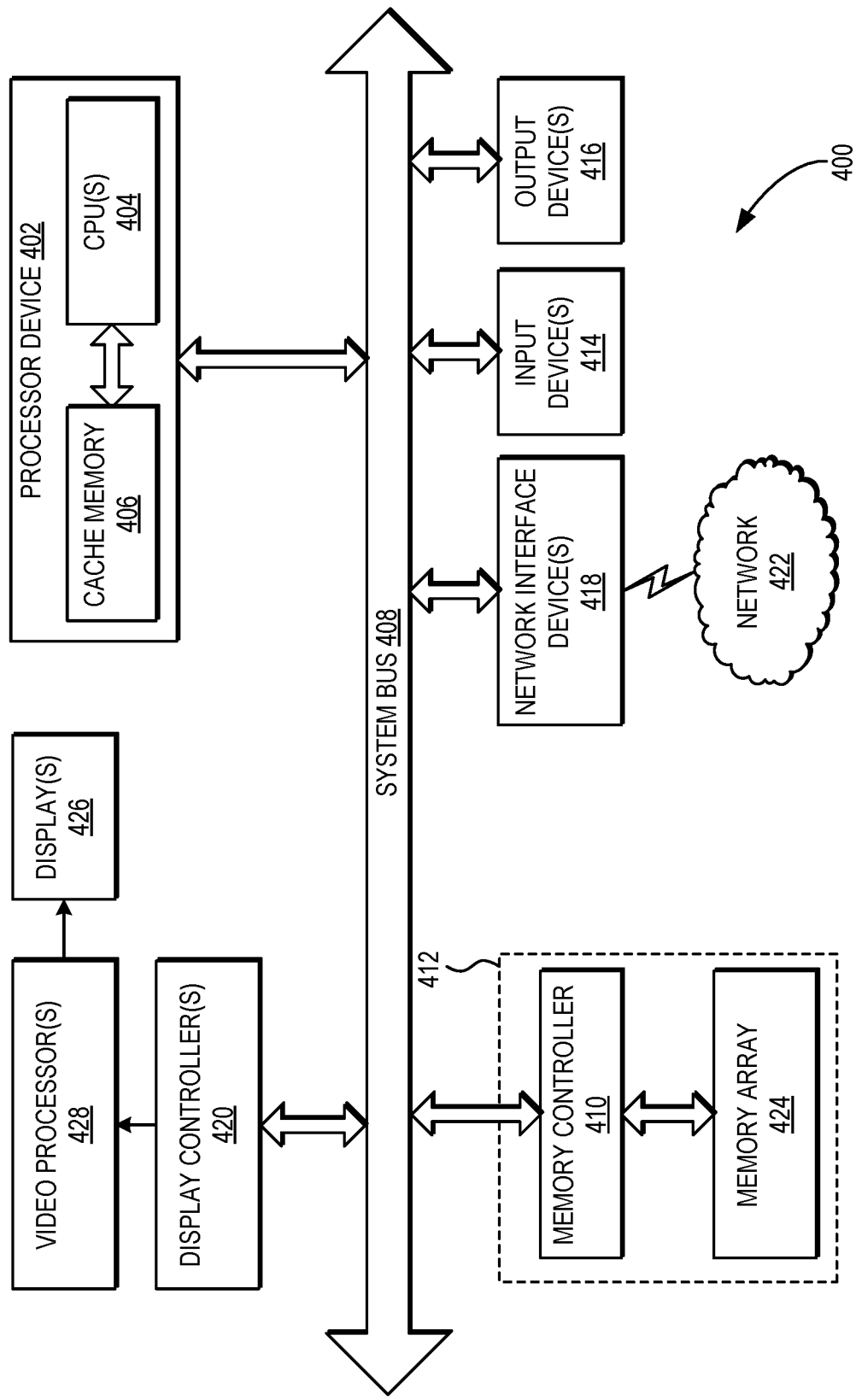
FIG. 4 is a block diagram of an exemplary processor-based device that can include the instruction processing circuit of FIG. 1.

In this regard, FIG. 4 illustrates an example of a processor-based device 400, which corresponds in functionality to the processor-based device 100 of FIG. 1. The processor-based device 400 includes a processor device 402 which comprises one or more CPUs 404 coupled to a cache memory 406. The CPU(s) 404 is also coupled to a system bus 408 and can intercouple devices included in the processor-based device 400. As is well known, the CPU(s) 404 communicates with these other devices by exchanging address, control, and data information over the system bus 408. For example, the CPU(s) 404 can communicate bus transaction requests to a memory controller 410. Although not illustrated in FIG. 4, multiple system buses 408 could be provided, wherein each system bus 408 constitutes a different fabric.

Other devices may be connected to the system bus 408. As illustrated in FIG. 4, these devices can include a memory system 412, one or more input devices 414, one or more output devices 416, one or more network interface devices 418, and one or more display controllers 420, as examples. The input device(s) 414 can include any type of input device, including, but not limited to, input keys, switches, voice processors, etc. The output device(s) 416 can include any type of output device, including, but not limited to, audio, video, other visual indicators, etc. The network interface device(s) 418 can be any devices configured to allow exchange of data to and from a network 422. The network 422 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 418 can be configured to support any type of communications protocol desired. The memory system 412 can include the memory controller 410 coupled to one or more memory arrays 424.

The CPU(s) 404 may also be configured to access the display controller(s) 420 over the system bus 408 to control information sent to one or more displays 426. The display controller(s) 420 sends information to the display(s) 426 to be displayed via one or more video processors 428, which process the information to be displayed into a format suitable for the display(s) 426. The display(s) 426 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor device. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor device, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor device may be a microprocessor, but in the alternative, the processor device may be any conventional processor device, controller, microcontroller, or state machine. A processor device may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor device such that the processor device can read information from, and write information to, the storage medium. In the alternative, the storage medium may be integral to the processor device. The processor device and the storage medium may reside in an ASIC. The ASIC may reside in a remote station. In the alternative, the processor device and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device, comprising:
    an opcode match register;
    an accumulator register; and
    an instruction processing circuit configured to:
        determine that an instruction of a plurality of instructions matches an opcode value stored in the opcode match register; and
        responsive to determining that the instruction matches the opcode value stored in the opcode match register, modify a value stored in the accumulator register without halting or modifying program control flow.

2. The processor device of clause 1, wherein the instruction processing circuit is configured to determine that the instruction matches the opcode value stored in the opcode match register by being configured to determine that an opcode of the instruction matches the opcode value stored in the opcode match register.

3. The processor device of any one of clauses 1-2, wherein:
    the processor device further comprises an opcode mask register that stores an opcode mask; and
    the instruction processing circuit is configured to determine that the opcode of the instruction matches the opcode value stored in the opcode match register by being configured to determine that the opcode of the instruction masked using the opcode mask matches the opcode value masked using the opcode mask.

4. The processor device of any one of clauses 1-3, wherein:
    the value stored in the accumulator register represents a count of occurrences of the instruction; and
    the instruction processing circuit is configured to modify the value stored in the accumulator register by being configured to modify the value stored in the accumulator register by a value of one (1).

5. The processor device of any one of clauses 1-3, wherein:
    the value stored in the accumulator register represents a total time spent processing occurrences of the instruction; and
    the instruction processing circuit is configured to modify the value stored in the accumulator register by being configured to modify the value stored in the accumulator register by a time value indicating a time interval between fetching of the instruction and an occurrence of an end event.
6. The processor device of clause 5, wherein the end event comprises one of retiring of the instruction, determining whether the instruction matches the opcode value, and tagging the instruction as a result of the determining.
7. The processor device of any one of clauses 1-6, wherein:
the processor device further comprises a mode indicator that indicates one of an instruction count mode of the instruction processing circuit and a total processing time mode of the instruction processing circuit; and
the instruction processing circuit is configured to modify the value stored in the accumulator register based on the mode indicator.
8. The processor device of any one of clauses 1-7, wherein:
the processor device further comprises an opcode match control register;
the instruction processing circuit is further configured to determine that a value of the opcode match control register is an enable value; and
the instruction processing circuit is configured to determine that the instruction matches the opcode value stored in the opcode match register responsive to determining that the value of the opcode match control register is the enable value.
9. The processor device of clause 8, configured to:
set, using an executing software process, the value of the opcode match control register to the enable value while executing in a first software context; and
set, using the executing software process, the value of the opcode match control register to a disable value while executing in a second software context.
10. The processor device of any one of clauses 1-9, wherein the instruction processing circuit is further configured to read the value stored in the accumulator register.
11. The processor device of any one of clauses 1-10, wherein the instruction processing circuit is further configured to reset the value stored in the accumulator register.
12. The processor device of any one of clauses 1-11, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
13. A processor device, comprising:
means for determining that an instruction of a plurality of instructions matches an opcode value stored in an opcode match register of the processor device; and
means for modifying a value stored in an accumulator register of the processor device without halting or modifying program control flow, responsive to determining that the instruction matches the opcode value stored in the opcode match register.
14. A method for tracking instruction handling using opcode matching, comprising:
determining, by an instruction processing circuit of a processor device, that an instruction of a plurality of instructions matches an opcode value stored in an opcode match register of the processor device; and
responsive to determining that the instruction matches the opcode value stored in the opcode match register, modifying, by the instruction processing circuit, a value stored in an accumulator register of the processor device, without halting or modifying program control flow.
15. The method of clause 14, wherein
determining that the instruction matches the opcode value stored in the opcode match register comprises determining that an opcode of the instruction matches the opcode value stored in the opcode match register.
16. The method of any one of clauses 14-15, wherein determining that the opcode of the instruction matches the opcode value stored in the opcode match register comprises determining that the opcode of the instruction masked using an opcode mask stored in an opcode mask register of the processor device matches the opcode value masked using the opcode mask.
17. The method of any one of clauses 14-16, wherein:
the value stored in the accumulator register represents a count of occurrences of the instruction; and
modifying the value stored in the accumulator register comprises modifying the value stored in the accumulator register by a value of one (1).
18. The method of any one of clauses 14-16, wherein:
the value stored in the accumulator register represents a total time spent processing occurrences of the instruction; and
modifying the value stored in the accumulator register comprises modifying the value stored in the accumulator register by a time value indicating a time interval between fetching of the instruction and an occurrence of an end event.
19. The method of clause 18, wherein the end event comprises one of retiring the instruction, determining whether the instruction matches the opcode value, and tagging the instruction as a result of the determining.
20. The method of any one of clauses 14-19, wherein modifying the value stored in the accumulator register is based on a mode indicator that indicates one of an instruction count mode of the instruction processing circuit and a total processing time mode of the instruction processing circuit.
21. The method of any one of clauses 14-20, wherein:
the processor device further comprises an opcode match control register;
the method further comprises determining that a value of the opcode match control register is an enable value; and
determining that the instruction matches the opcode value stored in the opcode match register is responsive to determining that the value of the opcode match control register is the enable value.
22. The method of clause 21, further comprising:
setting, by an executing software process, the value of the opcode match control register to the enable value while executing in a first software context; and setting, by the executing software process, the value of the opcode match control register to a disable value while executing in a second software context.

23. The method of any one of clauses 14-22, further comprising reading the value stored in the accumulator register.

24. The method of any one of clauses 14-23, further comprising resetting the value stored in the accumulator register.

25. A non-transitory computer-readable medium, having stored thereon computer-executable instructions that, when executed, cause a processor device of a processor-based device to:
   determine that an instruction of a plurality of instructions matches an opcode value stored in an opcode match register of the processor device; and
   responsive to determining that the instruction matches the opcode value stored in the opcode match register, modify a value stored in an accumulator register of the processor device, without halting or modifying program control flow.

26. The non-transitory computer-readable medium of clause 25, wherein the computer-executable instructions cause the processor device to determine that the instruction matches the opcode value stored in the opcode match register by causing the processor device to determine that an opcode of the instruction matches the opcode value stored in the opcode match register.

27. The non-transitory computer-readable medium of any one of clauses 25-26, wherein the computer-executable instructions cause the processor device to determine that the opcode of the instruction matches the opcode value stored in the opcode match register by causing the processor device to determine that the opcode of the instruction masked using an opcode mask stored in an opcode mask register of the processor device matches the opcode value masked using the opcode mask.

28. The non-transitory computer-readable medium of any one of clauses 25-27, wherein:
   the value stored in the accumulator register represents a count of occurrences of the instruction; and
   the computer-executable instructions cause the processor device to modify the value stored in the accumulator register by causing the processor device to modify the value stored in the accumulator register by a value of one (1).

29. The non-transitory computer-readable medium of any one of clauses 25-27, wherein:
   the value stored in the accumulator register represents a total time spent processing occurrences of the instruction; and
   the computer-executable instructions cause the processor device to modify the value stored in the accumulator register by causing the processor device to modify the value stored in the accumulator register by a time value indicating a time interval between fetching of the instruction and an occurrence of an end event.

30. The non-transitory computer-readable medium of any one of clauses 25-29, wherein the computer-executable instructions cause the processor device to modify the value stored in the accumulator register based on a mode indicator that indicates one of an instruction count mode of the instruction processing circuit and a total processing time mode of the instruction processing circuit.

What is claimed is:

1. A processor device, comprising:
   an opcode match register;
   an accumulator register; and
   an instruction processing circuit configured to:
      determine that an instruction of a plurality of instructions matches an opcode value stored in the opcode match register; and
      responsive to determining that the instruction matches the opcode value stored in the opcode match register, modify a value stored in the accumulator register without halting or modifying program control flow;
   wherein:
      the value stored in the accumulator register represents a total time spent processing occurrences of the instruction; and
      the instruction processing circuit is configured to modify the value stored in the accumulator register by a time value indicating a time interval between fetching of the instruction and an occurrence of an end event.

2. The processor device of claim 1, wherein the instruction processing circuit is configured to determine that the instruction matches the opcode value stored in the opcode match register by being configured to determine that an opcode of the instruction matches the opcode value stored in the opcode match register.

3. The processor device of claim 2, wherein:
   the processor device further comprises an opcode mask register that stores an opcode mask; and
   the instruction processing circuit is configured to determine that the opcode of the instruction matches the opcode value stored in the opcode match register by being configured to determine that the opcode of the instruction masked using the opcode mask matches the opcode value masked using the opcode mask.

4. The processor device of claim 1, wherein the end event comprises one of retiring of the instruction, determining whether the instruction matches the opcode value, and tagging the instruction as a result of the determining.

5. The processor device of claim 1, wherein:
   the processor device further comprises a mode indicator that indicates one of an instruction count mode of the instruction processing circuit and a total processing time mode of the instruction processing circuit; and
   the instruction processing circuit is configured to modify the value stored in the accumulator register based on the mode indicator.

6. The processor device of claim 1, wherein:
   the processor device further comprises an opcode match control register;
   the instruction processing circuit is further configured to determine that a value of the opcode match control register is an enable value; and
   the instruction processing circuit is configured to determine that the instruction matches the opcode value stored in the opcode match register responsive to determining that the value of the opcode match control register is the enable value.

7. The processor device of claim 6, configured to:
   set, using an executing software process, the value of the opcode match control register to the enable value while executing in a first software context; and
   set, using the executing software process, the value of the opcode match control register to a disable value while executing in a second software context.

8. The processor device of claim 1, wherein the instruction processing circuit is further configured to read the value stored in the accumulator register.

9. The processor device of claim 1, wherein the instruction processing circuit is further configured to reset the value stored in the accumulator register.

10. The processor device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A processor device, comprising:
means for determining that an instruction of a plurality of instructions matches an opcode value stored in an opcode match register of the processor device; and
means for modifying a value stored in an accumulator register of the processor device without halting or modifying program control flow, responsive to determining that the instruction matches the opcode value stored in the opcode match register;
wherein:
the value stored in the accumulator register represents a total time spent processing occurrences of the instruction; and
the means for modifying the value stored in the accumulator register comprises means for modifying the value stored in the accumulator register by a time value indicating a time interval between fetching of the instruction and an occurrence of an end event.

12. A method for tracking instruction handling using opcode matching, comprising:
determining, by an instruction processing circuit of a processor device, that an instruction of a plurality of instructions matches an opcode value stored in an opcode match register of the processor device; and
responsive to determining that the instruction matches the opcode value stored in the opcode match register, modifying, by the instruction processing circuit, a value stored in an accumulator register of the processor device, without halting or modifying program control flow;
wherein:
the value stored in the accumulator register represents a total time spent processing occurrences of the instruction; and
modifying the value stored in the accumulator register comprises modifying the value stored in the accumulator register by a time value indicating a time interval between fetching of the instruction and an occurrence of an end event.

13. The method of claim 12, wherein
determining that the instruction matches the opcode value stored in the opcode match register comprises determining that an opcode of the instruction matches the opcode value stored in the opcode match register.

14. The method of claim 13, wherein determining that the opcode of the instruction matches the opcode value stored in the opcode match register comprises determining that the opcode of the instruction masked using an opcode mask stored in an opcode mask register of the processor device matches the opcode value masked using the opcode mask.

15. The method of claim 12, wherein the end event comprises one of retiring the instruction, determining whether the instruction matches the opcode value, and tagging the instruction as a result of the determining.

16. The method of claim 12, wherein modifying the value stored in the accumulator register is based on a mode indicator that indicates one of an instruction count mode of the instruction processing circuit and a total processing time mode of the instruction processing circuit.

17. The method of claim 12, wherein:
the processor device further comprises an opcode match control register;
the method further comprises determining that a value of the opcode match control register is an enable value; and
determining that the instruction matches the opcode value stored in the opcode match register is responsive to determining that the value of the opcode match control register is the enable value.

18. The method of claim 17, further comprising:
setting, by an executing software process, the value of the opcode match control register to the enable value while executing in a first software context; and
setting, by the executing software process, the value of the opcode match control register to a disable value while executing in a second software context.

19. The method of claim 12, further comprising reading the value stored in the accumulator register.

20. The method of claim 12, further comprising resetting the value stored in the accumulator register.

21. A non-transitory computer-readable medium, having stored thereon computer-executable instructions that, when executed, cause a processor device of a processor-based device to:
determine that an instruction of a plurality of instructions matches an opcode value stored in an opcode match register of the processor device; and
responsive to determining that the instruction matches the opcode value stored in the opcode match register, modify a value stored in an accumulator register of the processor device, without halting or modifying program control flow;
wherein:
the value stored in the accumulator register represents a total time spent processing occurrences of the instruction; and
the computer-executable instructions cause the processor device to modify the value stored in the accumulator register by a time value indicating a time interval between fetching of the instruction and an occurrence of an end event.

22. The non-transitory computer-readable medium of claim 21, wherein the computer-executable instructions cause the processor device to determine that the instruction matches the opcode value stored in the opcode match register by causing the processor device to determine that an opcode of the instruction matches the opcode value stored in the opcode match register.

23. The non-transitory computer-readable medium of claim 22, wherein the computer-executable instructions cause the processor device to determine that the opcode of the instruction matches the opcode value stored in the opcode match register by causing the processor device to determine that the opcode of the instruction masked using an opcode mask stored in an opcode mask register of the processor device matches the opcode value masked using the opcode mask.

24. The non-transitory computer-readable medium of claim 21, wherein the computer-executable instructions cause the processor device to modify the value stored in the accumulator register based on a mode indicator that indicates one of an instruction count mode of the instruction processing circuit and a total processing time mode of the instruction processing circuit.

* * * * *